United States Patent
Ohkuma

(10) Patent No.: US 7,758,261 B2
(45) Date of Patent: Jul. 20, 2010

(54) LIGHT AMOUNT ADJUSTMENT APPARATUS AND IMAGE PICKUP APPARATUS

(75) Inventor: Hideo Ohkuma, Tokyo (JP)

(73) Assignee: Sony Corporation (JP)

( * ) Notice: Subject to any disclaimer, the term of this patent is extended or adjusted under 35 U.S.C. 154(b) by 177 days.

(21) Appl. No.: 12/008,863

(22) Filed: Jan. 15, 2008

(65) Prior Publication Data

US 2008/0175585 A1 Jul. 24, 2008

(30) Foreign Application Priority Data

Jan. 18, 2007 (JP) ............... P2007-009442

(51) Int. Cl.
- *G02F 1/00* (2006.01)
- *G04C 13/11* (2006.01)
- *H02K 37/00* (2006.01)
- *H02K 1/22* (2006.01)

(52) U.S. Cl. .................. 396/457; 310/49.01; 310/261.1

(58) Field of Classification Search .................. 396/506, 396/452, 457, 463, 469, 484, 486, 487, 490, 396/493, 510; 310/35, 46, 49 R, 154.02, 310/194, 208, 254, 259, 261, 261.1, 49.01
See application file for complete search history.

(56) References Cited

U.S. PATENT DOCUMENTS

2006/0220490 A1  10/2006  Watanabe

FOREIGN PATENT DOCUMENTS

| CN | 1841891 A | 10/2006 |
|---|---|---|
| JP | 63-164187 A | 7/1988 |
| JP | 1-201888 A | 8/1989 |
| JP | 3125946 A | 5/1991 |
| JP | 6-186613 A | 7/1994 |
| JP | 7-159849 A | 6/1995 |
| JP | 7-234435 A | 9/1995 |
| JP | 08-288127 A | 11/1996 |
| JP | 09-045545 A | 2/1997 |
| JP | 10-225045 A | 8/1998 |
| JP | 2004-095703 A | 3/2004 |
| JP | 2006-218916 A | 8/2006 |
| JP | 2006-288036 A | 10/2006 |

*Primary Examiner*—Rochelle-Anne J Blackman
(74) *Attorney, Agent, or Firm*—Lerner, David, Littenberg, Krumholz & Mentlik, LLP

(57) ABSTRACT

Disclosed herein is a light amount adjustment apparatus, including: a light amount adjustment member; a rotatable magnet formed in a disk shape; a driving arm configured to be pivoted by rotation of the magnet to operate the light amount adjustment member; a core having a pair of confronting portions positioned so as to sandwich the magnet from an outer circumference side and a connecting portion configured to connect end portions of the confronting portions to each other; a coil through which one of the portions of the core extends; and a base member having the core attached to the base member and supporting the magnet for rotation on the base member. The base member has a plurality of attaching projections provided at least at two places of the base member for attaching the core to the base member. The attaching projections have a small projection for fitting with the core.

6 Claims, 15 Drawing Sheets

LIGHT AMOUNT ADJUSTMENT APPARATUS AND IMAGE PICKUP APPARATUS

CROSS REFERENCES TO RELATED APPLICATIONS

The present application claims priority from Japanese Patent Application No. JP 2007-009442 filed in the Japanese Patent Office on Jan. 18, 2007, the entire content of which is incorporated herein by reference.

BACKGROUND OF THE INVENTION

1. Field of the Invention

This invention relates to a light amount adjustment apparatus and an image pickup apparatus, and more particular to a light amount adjustment apparatus and an image pickup apparatus wherein a core of an electromagnet is attached to a base member.

2. Description of the Related Art

An image pickup apparatus of a video camera, a still camera or a light apparatus includes a light amount adjustment apparatus for adjusting the amount of light fetched through a lens group.

In one of such light amount adjustment apparatus, shutter blades, a filter blade or the like serving as light amount adjustment members are supported for pivotal motion on a base member. The light amount adjustment members are pivoted by an electromagnet or actuator including a magnet, a coil and a core having a pair of confronting portions to adjust the light amount. One of light amount adjustment apparatus of the type described is disclosed, for example, in Japanese Patent Laid-Open No. 2004-95703 (hereinafter referred to as Patent Document 1).

The electromagnet of the light amount adjustment apparatus disclosed in Patent Document 1 is attached to the base member in such a state that the paired confronting portions of the core are expanded by a positioning projection provided on the base member.

SUMMARY OF THE INVENTION

However, in the light amount adjustment apparatus disclosed in Patent Document 1, since the electromagnet is attached to the base member in such a state that the paired confronting portions of the core are expanded by the positioning projection, there is the possibility that the core may be deformed plastically or excessively high restoring force may be generated in the core. Therefore, it is necessary to work the pertaining elements with a very high degree of accuracy in finishing in order to prevent play of the core with respect to the base member and keep the magnet and the core at appropriate positions relative to each other.

Therefore, it is demanded to provide a light amount adjustment apparatus and an image pickup apparatus wherein play of a core with respect to a base member is prevented without raising the accuracy in finishing of pertaining elements.

According to an embodiment of the present invention, there is provided a light amount adjustment apparatus including a light amount adjustment member configured to be operated in a predetermined direction to adjust the amount of light transmitted through a lens group, a rotatable magnet formed in a disk shape, a driving arm configured to be pivoted by rotation of the magnet to operate the light amount adjustment member, a core having a pair of confronting portions positioned so as to sandwich the magnet from an outer circumference side and a connecting portion configured to connect end portions of the confronting portions to each other, a coil through which one of the confronting portions of the core extends, and a base member having the core attached to the base member and supporting the magnet for rotation on the base member, the base member having a plurality of attaching projections provided at least at two places of the base member for attaching the core to the base member, the attaching projections having a small projection for fitting with the core.

In the light amount adjustment apparatus, the core is attached to the base member in a state wherein it is force fitted between the attaching projections with the small protrusion of the attaching projections pressed against the core.

With the light amount adjustment apparatus, play of the core with respect to the base member can be prevented without raising the working accuracy of pertaining elements relating to the attachment of the core to the base member.

The light amount adjustment apparatus may be configured such that the core has a circular attached hole formed in the core, and one of the attaching projections which is inserted in the attached hole is formed in a substantially cylindrical shape and has at least two small protrusions in a spaced relationship from each other in a circumferential direction on an outer circumferential face of the attaching projections. With the light amount adjustment apparatus, stabilization of the attaching state of the core to the base member can be anticipated.

The light amount adjustment apparatus may be configured such that the attaching projections include first and second sandwiching portions configured to sandwich the core between the first and second sandwiching portions, the first sandwiching portion having a small protrusion provided on the first sandwiching portion, the second sandwiching portion having a pressed portion formed on the second sandwiching portion such that the core is pressed in a face contacting relationship against the pressed portion. With the light amount adjustment apparatus, the core is attached to the base member in a state wherein it is held in face contact with the pressed face of the second sandwiching portion. Consequently, a stabilized attaching state of the core can be assured.

The attaching projections may be provided in the proximity of the magnet. With the light amount adjustment apparatus, the positional accuracy between the magnet and the core is improved, and reliability of operation of the light amount adjustment member can be assured.

The attaching projections may be provided at least at two positions on the opposite sides with respect to the coil in an axial direction. With the light amount adjustment apparatus, the distance between one and the other of the attaching projections is long, and consequently, stabilization of the attaching state of the core to the base member can be anticipated.

According to another embodiment of the present invention, there is provided an image pickup apparatus including a lens barrel having a predetermined lens group disposed inside, an apparatus body configured to support the lens barrel, and a light amount adjustment apparatus incorporated in the lens barrel and configured to adjust the amount of light fetched through the lens group, the light amount adjustment apparatus having a light amount adjustment member configured to be operated in a predetermined direction to adjust the amount of light transmitted through a lens group, a rotatable magnet formed in a disk shape, a driving arm configured to be pivoted by rotation of the magnet to operate the light amount adjustment member, a core having a pair of confronting portions positioned so as to sandwich the magnet from an outer circumference side and a connecting portion configured to connect end portions of the confronting portions to each other, a coil through which one of the confronting portions of the core extends, and a base member having the core attached to the base member and supporting the magnet for rotation on the base member, the base member having a plurality of attaching projections provided at least at two places of the base member for attaching the core to the attaching projections, the attaching projections having a small projection for fitting with the core.

In the image pickup apparatus, the core is attached to the base member in a state wherein it is force fitted between the attaching projections with the small protrusion of the attaching projections pressed against the core.

With the image pickup apparatus, play of the core with respect to the base member can be prevented without raising the working accuracy of pertaining elements relating to the attachment of the core to the base member.

The above and other objects, features and advantages of the present invention will become apparent from the following description and the appended claims, taken in conjunction with the accompanying drawings in which like parts or elements denoted by like reference symbols.

DETAILED DESCRIPTION OF THE PREFERRED EMBODIMENT

In the following, a preferred embodiment of the present invention is described in detail with reference to the accompanying drawings.

In the embodiment described below, the present invention is applied to a still camera. It is to be noted that the application of the present invention is not limited to a still camera, but the present invention can be applied widely, for example, to video cameras and various image pickup apparatus incorporated in various other apparatus.

In the following description, the directions such as forward, backward, upward, downward, leftward and rightward directions are represented as directions as viewed from an image pickup person upon image pickup of the still camera. Accordingly, the image pickup object side is represented as the front side while the image pickup person side is represented as the rear side.

It is to be noted that the forward, backward, upward, downward, leftward and rightward directions used in the following description are determined for the convenience of description, but such directions can be applied suitably when the present invention is carried out.

Figure 1:
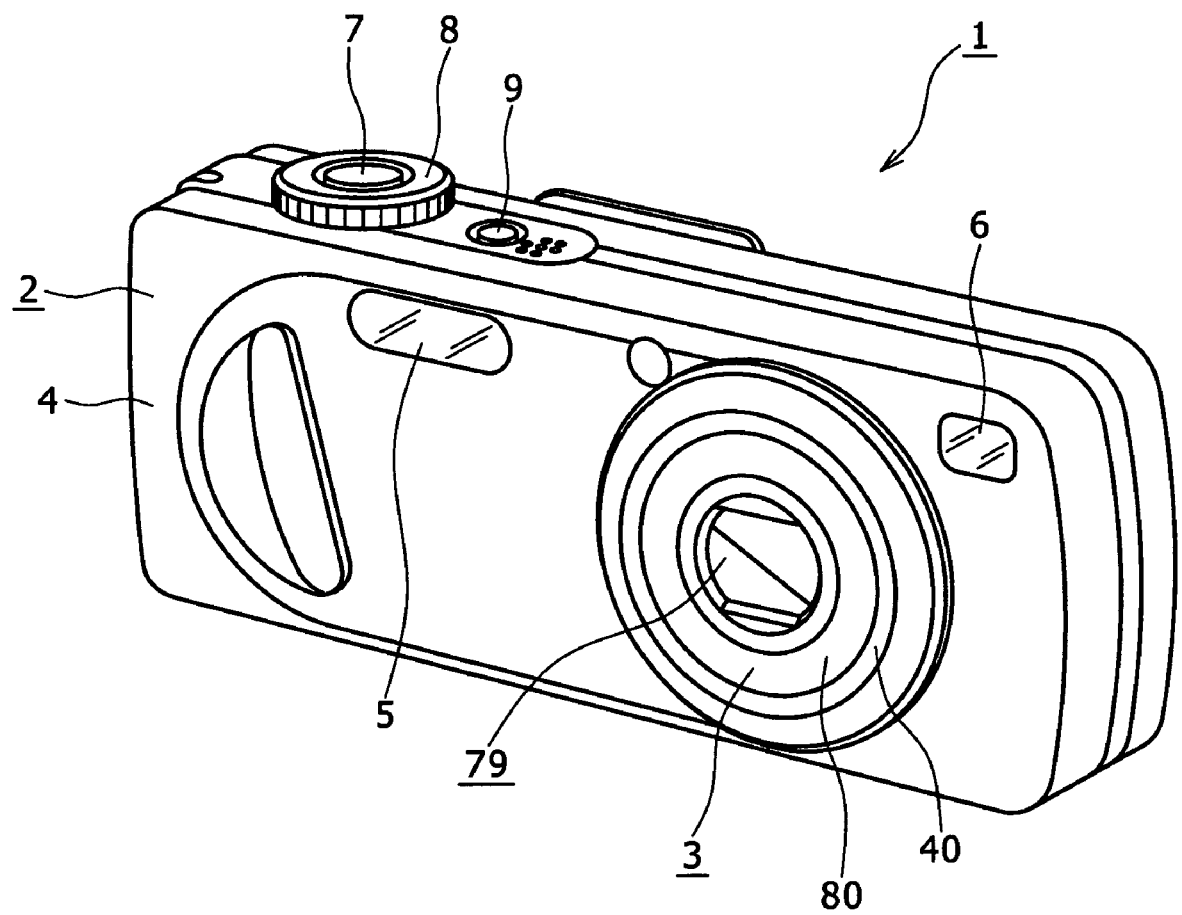
FIG. 1 is a perspective view showing an image pickup apparatus to which the present invention is applied in a state wherein a lens barrel is accommodated in an apparatus body.
Figure 2:
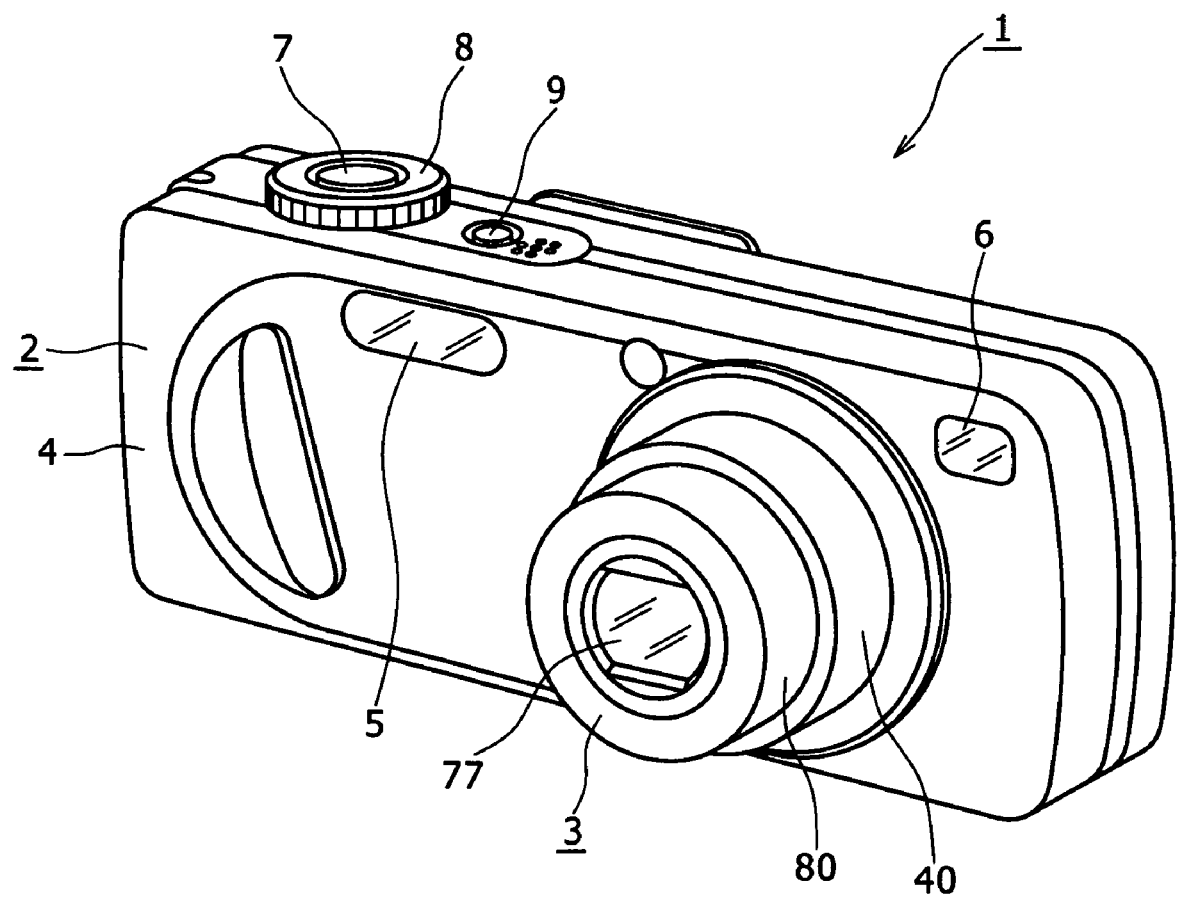
FIG. 2 is a similar view but showing the image pickup apparatus in another state wherein the lens barrel is projected from the apparatus body.

Referring first to FIGS. 1 and 2, the image pickup apparatus 1 shown includes an apparatus body 2 and a lens barrel 3 supported for movement in forward and backward directions, that is, in the opposite directions of an optical axis, on the apparatus body 2. When the image pickup apparatus 1 is not used for image pickup or in a like case, the lens barrel 3 is accommodated in the apparatus body 2 as seen in FIG. 1, but when the image pickup apparatus 1 is used for image pickup or in some other case, the lens barrel 3 is projected forwardly from the apparatus body 2 as seen in FIG. 2. Thus, in the present image pickup apparatus 1, the lens barrel 3 is formed as a lens barrel of the collapsible type.

Since the image pickup apparatus 1 includes the collapsible lens barrel 3, both of miniaturization or reduced thickness in a non-image pickup state of the image pickup apparatus 1 and assurance of a good optical performance in an image pickup state.

Figure 3:
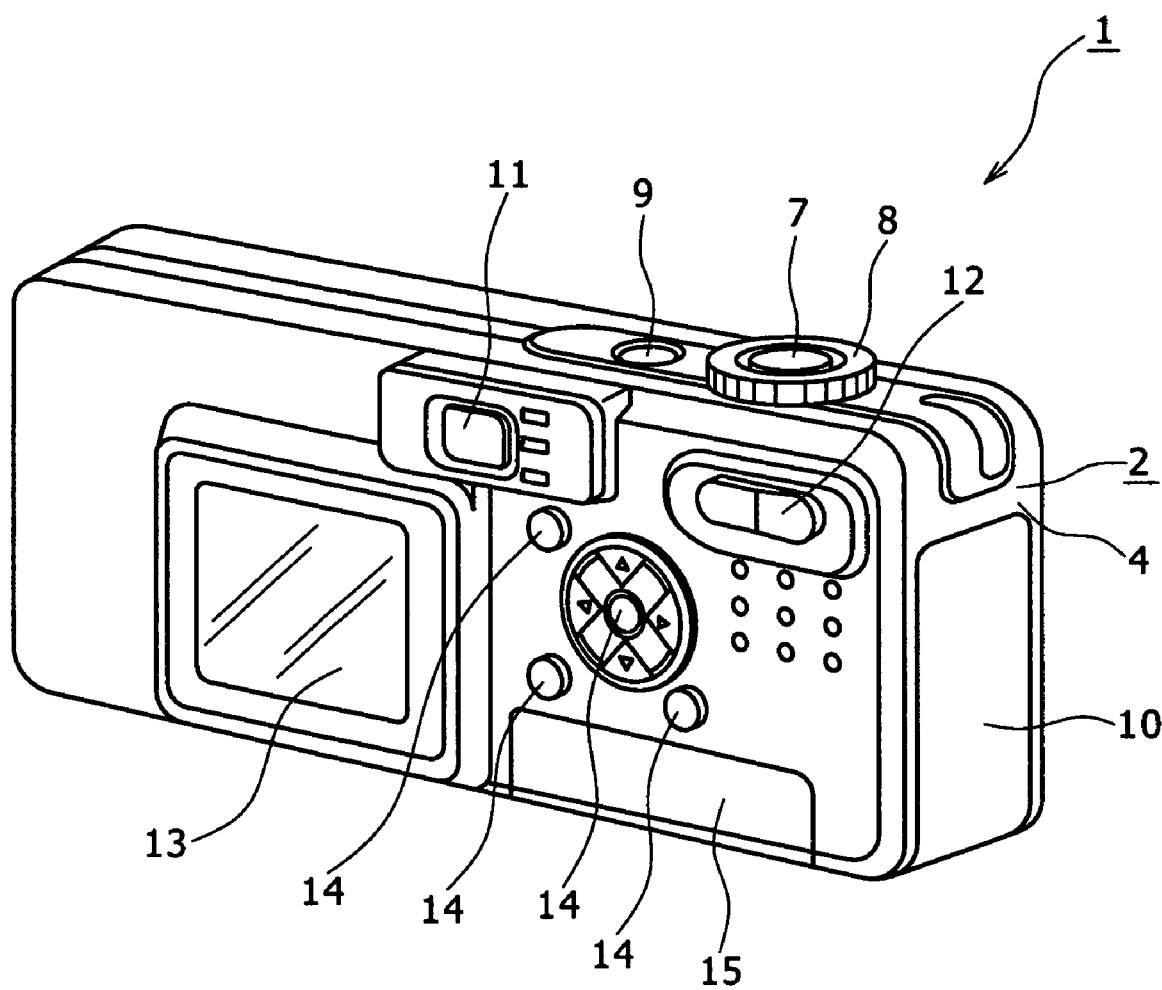
FIG. 3 is a perspective view of the image pickup apparatus in a state wherein it is viewed from the opposite side to that in FIGS. 1 and 2.

Referring to FIGS. 1 to 3, the apparatus body 2 has various elements disposed on the inner side and the outer side of a housing 4 of a horizontally elongated and flattened outer profile.

A flash 5 and a finder window 6 are provided on the front face of the apparatus body 2. A shutter button 7, a mode changeover dial 8 and a power supply button 9 are provided on the top face of the apparatus body 2. A battery cover 10 is provided on the right face of the apparatus body 2 such that it can be opened or closed to allow insertion and removal of a battery not shown into and from the apparatus body 2. A finder 11, a zoom switch 12, a display screen 13, operation buttons 14 and a terminal cover 15 are provided on the rear face of apparatus body 2. A power supply terminal, input and output terminals and so forth not shown are provided on the inner side of the terminal cover 15.

Figure 4:
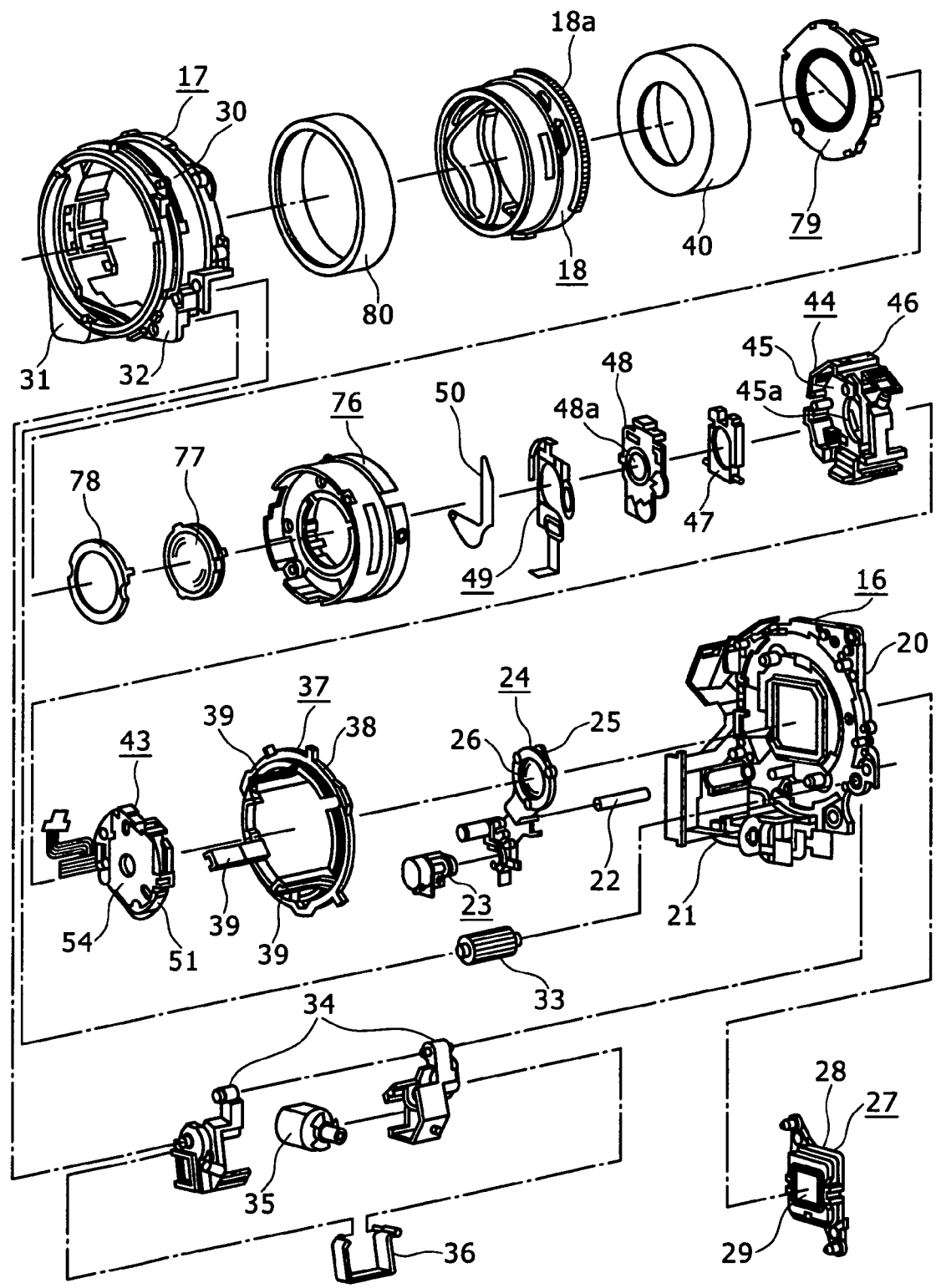
FIG. 4 is an explode perspective view of the lens barrel.
Figure 5:
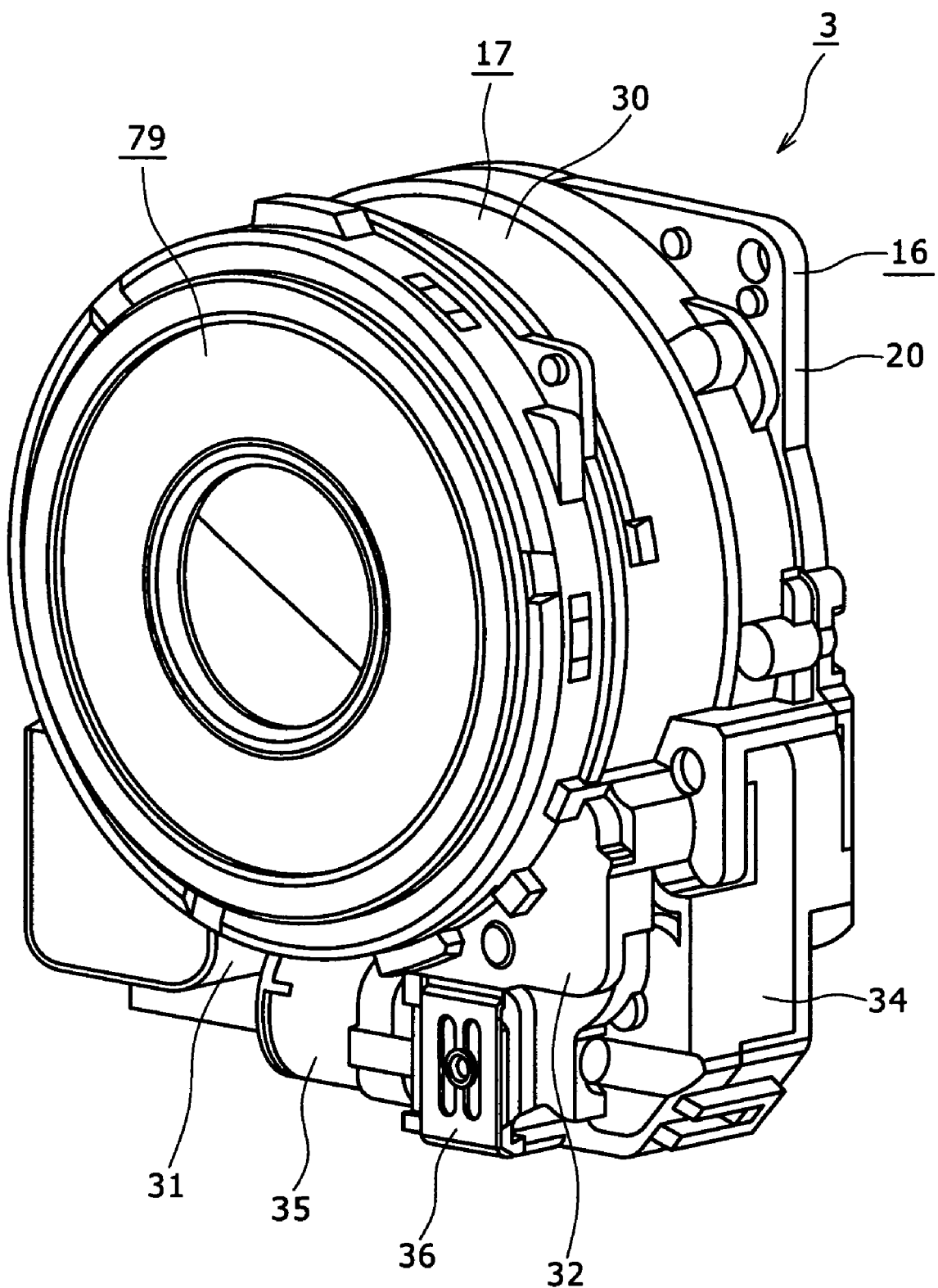
FIG. 5 is an enlarged perspective view of the lens barrel.
Figure 6:
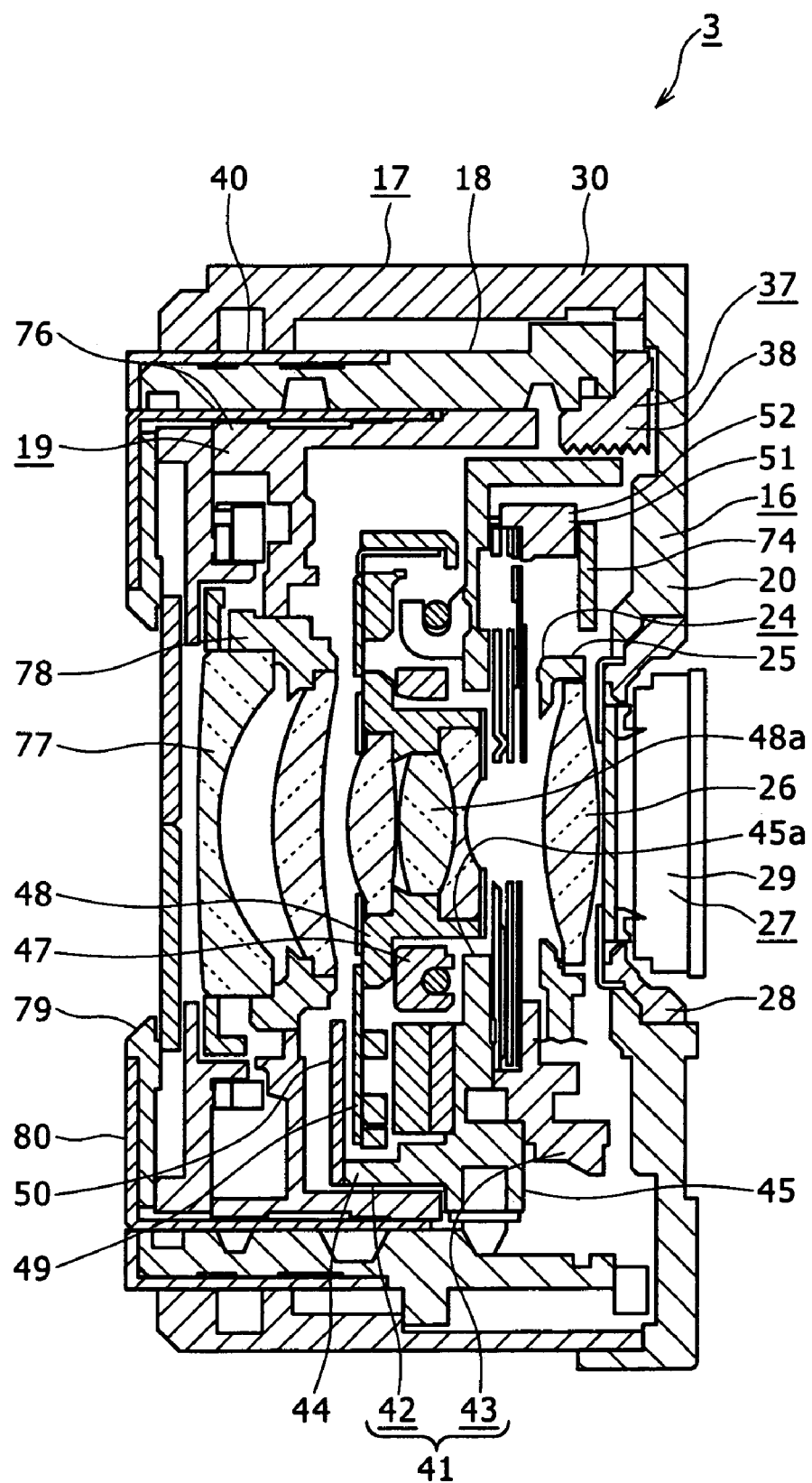
FIG. 6 is an enlarged cross sectional view of the lens barrel in a collapsed position.

Referring now to FIGS. 4 to 6, the lens barrel 3 includes a fixation member 16, a fixation ring 17 secured to the fixation member 16, and a cam cylinder 18 supported for rotation on the fixation ring 17. The lens barrel 3 further includes a first movable unit 19 supported for movement in the forward and backward directions, that is, in the directions of the optical axis, on the cam cylinder 18.

The fixation member 16 includes a base plate portion 20 formed in a substantially plate form and directed in the forward and backward directions, and an attaching projection 21 projecting forwardly from a lower end portion of the base plate portion 20.

A guide rod 22 is attached to the base plate portion 20.

A focusing motor unit 23 is attached to the attaching projection 21. A focusing movement unit 24 is moved in the forward and backward direction, that is, in the opposite directions of the optical axis, by the focusing motor unit 23. The focusing movement unit 24 includes a holding arm 25, and a focusing lens group 26 attached to the holding arm 25.

When the focusing motor unit 23 is driven, the focusing movement unit 24 is moved in a direction of the optical axis under the guidance of the guide rod 22.

An image pickup unit 27 is attached to a rear portion of the fixation member 16 as seen in FIG. 4. The image pickup unit 27 includes a holding frame member 28, and an image pickup element 29 such as, for example, a CCD (Charge Coupled Device) unit, held by the holding frame member 28. The image pickup unit 27 is attached at the holding frame member 28 thereof to the fixation member 16.

The fixation ring 17 is attached to the front of the fixation member 16 as seen in FIGS. 4 and 5. The fixation ring 17 has a cylindrical base portion 30 formed in a substantially cylindrical shape, a unit holding down portion 31 projecting from an lower end portion of the right end side of the cylindrical base portion 30, and a case attaching portion 32 projecting from a lower end portion of the left end side of the cylindrical base portion 30.

A gear arrangement hole not shown is formed at a position of the cylindrical base portion 30 corresponding to the case attaching portion 32.

In a state wherein the fixation ring 17 is attached to the fixation member 16, the guide rod 22 and the focusing motor unit 23 are held from forwardly by the unit holding down portion 31.

In the state wherein the fixation ring 17 is attached to the fixation member 16, a transmission gear 33 elongated in the axial direction is supported for rotation between the case attaching portion 32 and the fixation member 16. The transmission gear 33 is disposed in the gear arrangement hole formed in the cylindrical base portion 30.

A case body 34 is attached to the case attaching portion 32 of the fixation ring 17.

A motor 35 is attached in the case body 34 as seen in FIG. 4. A transmission gear group not shown is disposed in the case body 34 and held in meshing engagement with the transmission gear 33. When the motor 35 rotates, the driving force thereof is transmitted to the transmission gear 33 through the transmission gear group.

The case body 34 is attached to the fixation ring 17 and the fixation member 16 through an attaching leaf spring 36.

The cam cylinder 18 is supported for movement in the backward and forward directions and for rotation in a circumferential direction on the fixation ring 17 (referred to as FIGS. 4 and 6).

The cam cylinder 18 is substantially in a ring shape and has a rack gear 18a provided at part of an outer circumferential face at a rear end thereof.

The cam cylinder 18 is supported for movement in the backward and forward directions and for rotation in a circumferential direction on the fixation ring 17.

In the state wherein the cam cylinder 18 is supported on the fixation ring 17, the rack gear 18a meshes with the transmission gear 33 supported for rotation between the fixation member 16 and the fixation ring 17. Accordingly, when the motor 35 held on the case body 34 rotates, the driving force thereof is transmitted to the rack gear 18a through the transmission gear set and the transmission gear 33 so that the cam cylinder 18 is rotated in a direction corresponding to the direction of rotation of the motor 35. Consequently, the cam cylinder 18 is moved in the forward or backward direction while it rotates relative to the fixation ring 17.

A straightforward guide 37 is supported for movement in the backward and forward directions on the fixation ring 17. The straightforward guide 37 is formed as a unitary member from an annular portion 38 and three guide projections 39 projecting forwardly from the annular portion 38.

The straightforward guide 37 is supported for movement in the forward and backward directions and for rotation relative to the cam cylinder 18 on the fixation ring 17.

An ornamental ring 40 is attached to a front half of the fixation ring 17 as seen in FIGS. 4 and 6.

Figure 7:
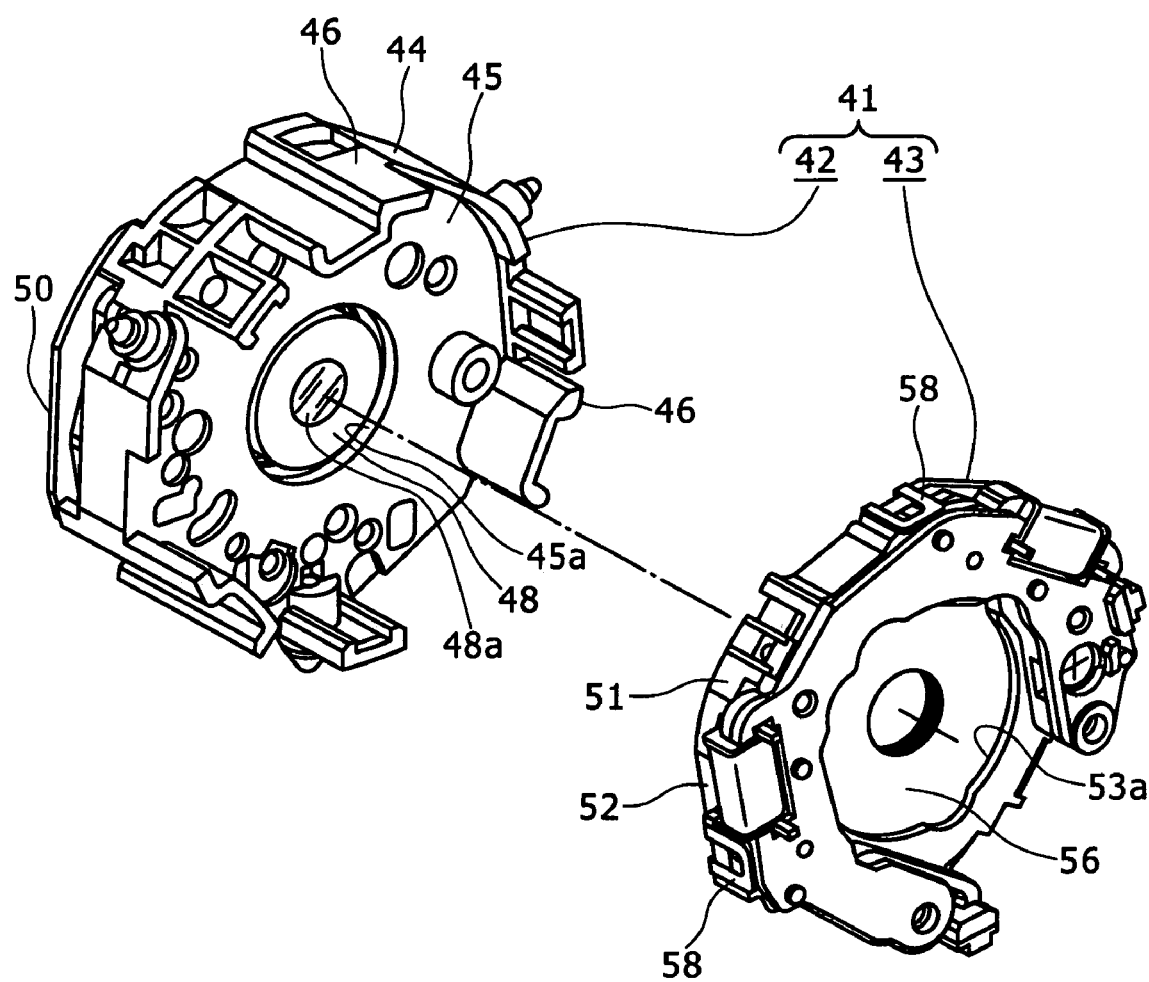
FIG. 7 is an enlarged perspective view showing an intermediate movable unit and a light amount adjustment apparatus of the lens barrel in a disassembled state.

A second movable unit 41 is supported on the cam cylinder 18 as seen in FIG. 6. The second movable unit 41 includes an intermediate movable unit 42 and a light amount adjustment apparatus 43 attached to the intermediate movable unit 42 as seen in FIG. 7.

The intermediate movable unit 42 includes several members supported on or attached to a base frame 44.

The base frame 44 includes a disk portion 45, and a supported face portion 46 provided on an outer circumferential portion of the disk portion 45.

A transmission opening 45a is formed at a central portion of the disk portion 45 such that it extends forwardly and backwardly through the disk portion 45.

A first correcting movable frame 47 is supported for movement in the leftward and rightward directions on the front face side of the base frame 44. A second correcting movable frame 48 is supported for movement in the upward and downward directions on the first correcting movable frame 47. A lens group 48a is attached to the second correcting movable frame 48.

A circuit board 49 is attached to the front face of the second correcting movable frame 48.

As described hereinabove, the first correcting movable frame 47 is supported on the base frame 44 while the second correcting movable frame 48 is supported on the first correcting movable frame 47, and in a state wherein the circuit board 49 is attached to the second correcting movable frame 48, an outer core 50 is attached to the front face of the base frame 44 to construct the intermediate movable unit 42.

Figure 8:
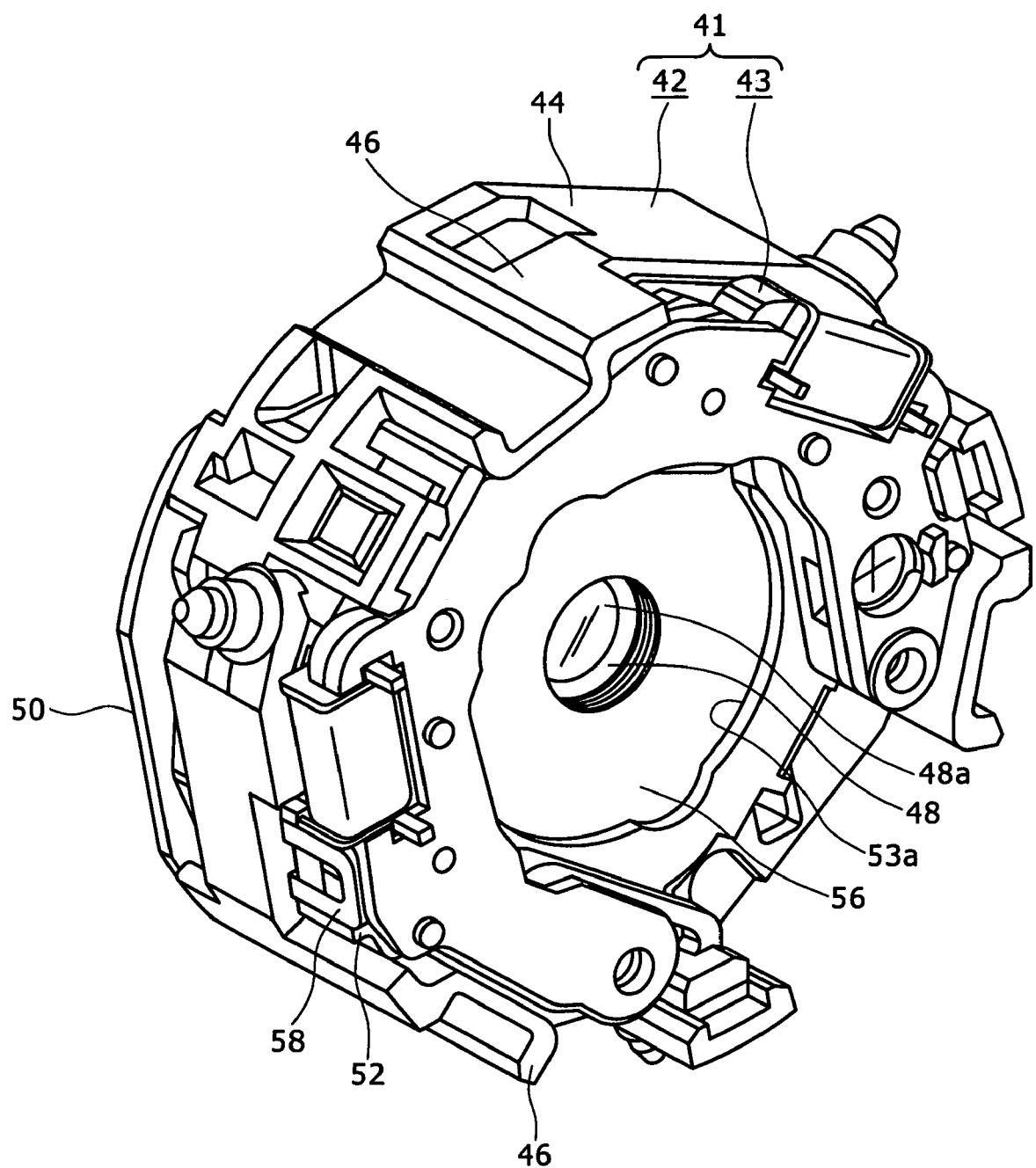
FIG. 8 is an enlarged perspective view of a second movable unit of the lens barrel.

The light amount adjustment apparatus 43 is attached to the rear face side of the intermediate movable unit 42, and the second movable unit 41 is formed from the intermediate movable unit 42 and the light amount adjustment apparatus 43 (as reference to FIGS. 7 and 8).

The second movable unit 41 is supported for movement in the forward and backward directions on the guide projections 39 of the straightforward guide 37 and supported for sliding movement on the cam cylinder 18. Accordingly, the second movable unit 41 is moved in the forward direction or the backward direction, that is, in a direction of the optical axis, under the guidance of the straightforward guide 37 by rotation of the cam cylinder 18.

The light amount adjustment apparatus 43 is attached to the rear face side of the base frame 44 as seen in FIGS. 7 and 8.

The light amount adjustment apparatus 43 includes a base member 51 and several members supported on or attached to the base member 51 as seen in FIGS. 7 to 10.

Figure 11:
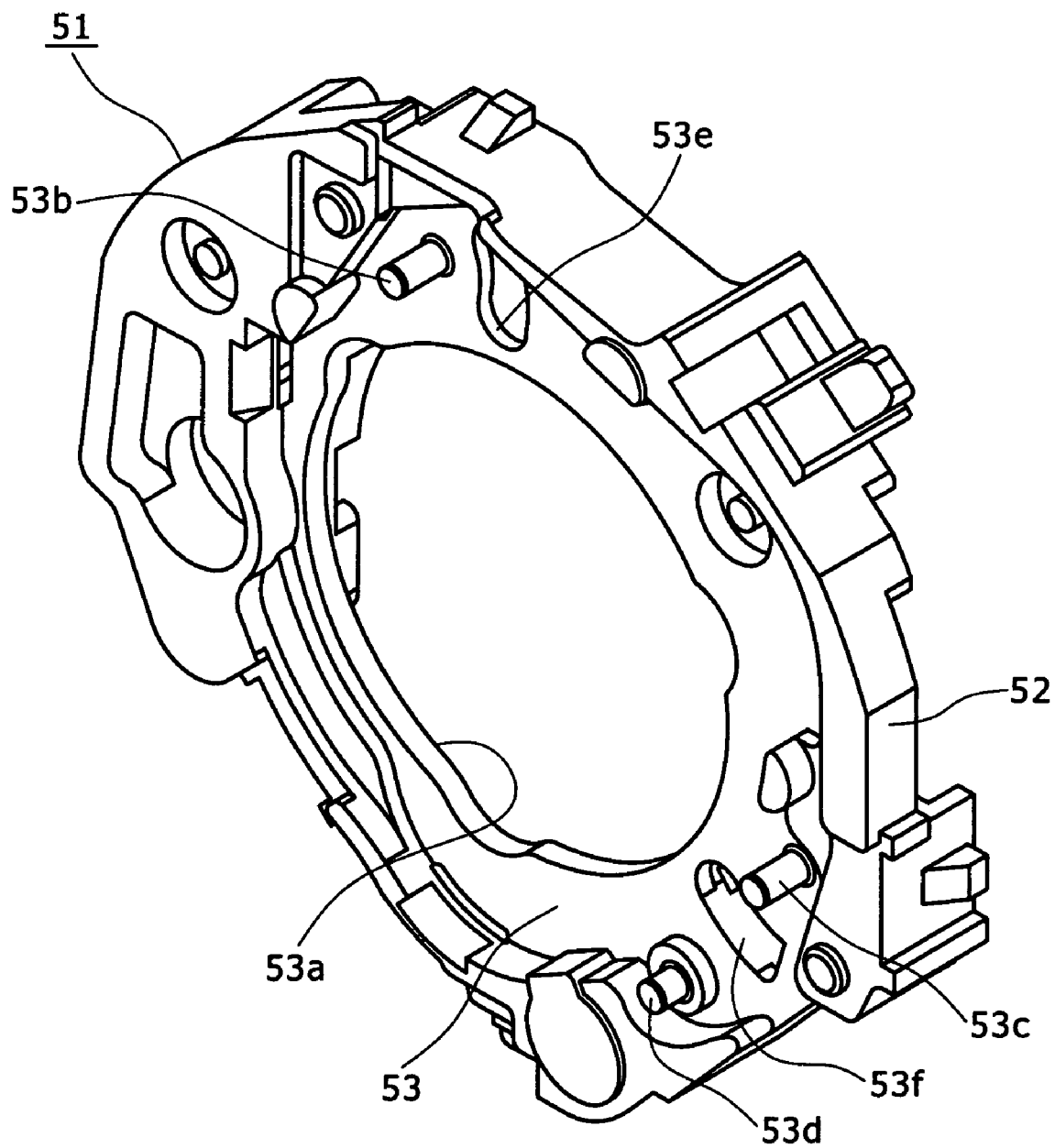
FIG. 11 is an enlarged perspective view of a base member of the light amount adjustment apparatus.

The base member 51 is formed in a substantially ring shape and has a mounting recessed portion 53 opened forwardly at a portion thereof except an outer circumferential portion 52 on the front face side as seen in FIG. 11. The base member 51 is formed at a portion thereof, at which the mounting recessed portion 53 is formed, with a thickness smaller than that of the outer circumferential portion 52.

A large perforation 53a is formed in the mounting recessed portion 53. A filter pivotal motion center shaft 53b and shutter pivotal motion center shafts 53c and 53d are provided at positions of the mounting recessed portion 53 around the perforation 53a such that they project forwardly. Arcuate fitting holes 53e and 53f are formed at the mounting recessed portion 53 such that they project forwardly and backwardly through the mounting recessed portion 53.

The filter pivotal motion center shaft 53b and the shutter pivotal motion center shafts 53c and 53d are positioned substantially on the opposite sides to each other across the perforation 53a. The shutter pivotal motion center shafts 53c and 53d are positioned in a spaced relationship from each other in a circumferential direction, and the fitting hole 53e is positioned in the proximity of the filter pivotal motion center shaft 53b while the fitting hole 53f is positioned between the shutter pivotal motion center shafts 53c and 53d.

Two sets of attaching projections 51a, 51b and 51c are provided on the rear face of the base member 51 such that they project rearwardly. The attaching projections 51a, 51b and 51c in one set are used to attach a first actuator hereinafter described to the base member 51, and the attaching projections 51a, 51b and 51c in the other set are used to attach a second actuator hereinafter described to the base member 51.

The attaching projection 51a is formed in a substantially cylindrical shape and has, for example three small protrusions 51d provided on an outer circumferential face thereof in a spaced relationship from each other in the circumferential direction.

The attaching projection 51b and the attaching projection 51c are provided in an opposing relationship to each other. A small protrusion 51e is provided on a face of the attaching projection 51b, which is positioned on the outer side, opposing to the attaching projection 51c. The attaching projection 51c positioned on the inner side is formed at a face thereof opposing to the attaching projection 51b as a pushed face 51f.

Figure 9:
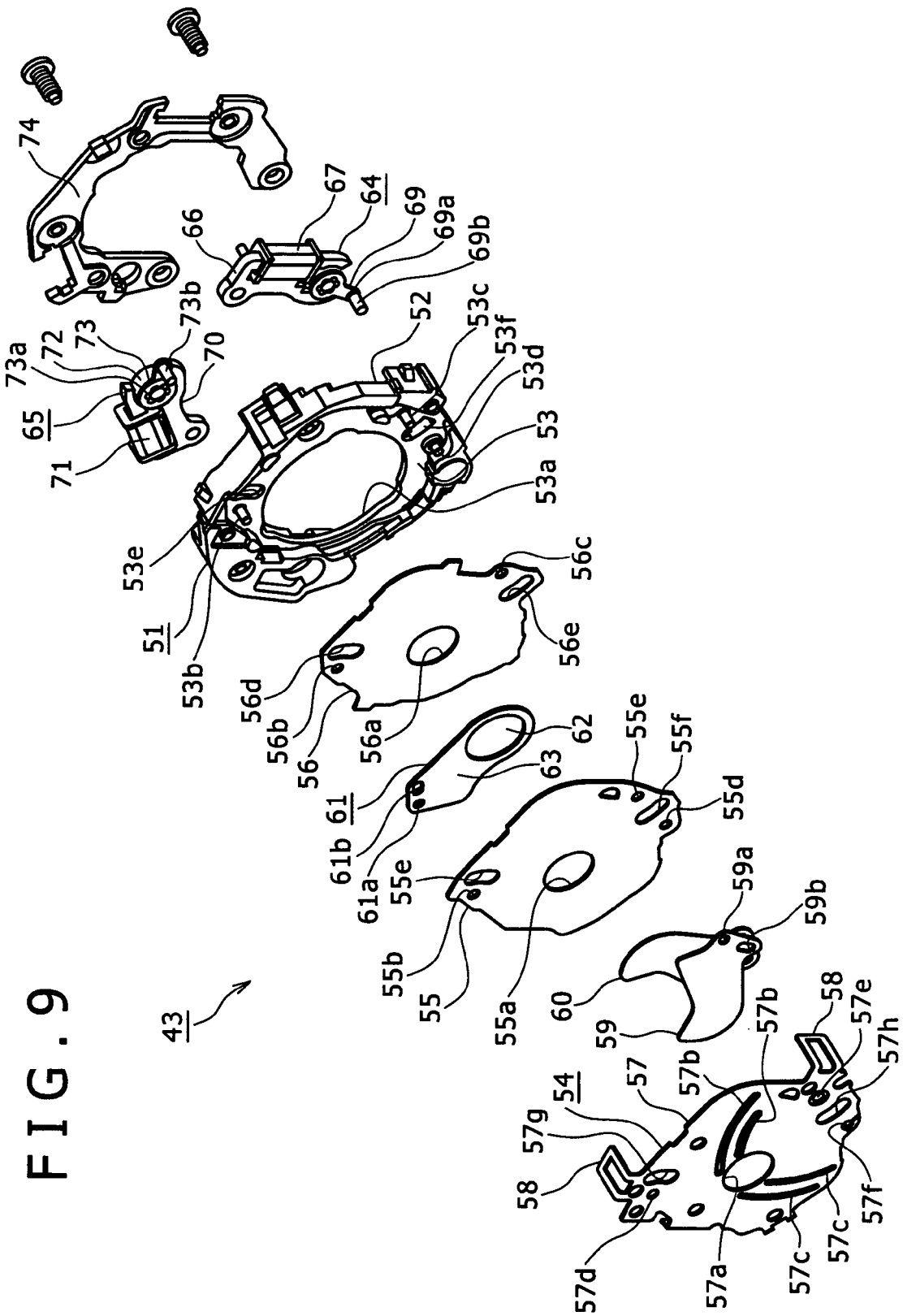
FIG. 9 is an exploded perspective view of the light amount adjustment apparatus.
Figure 10:
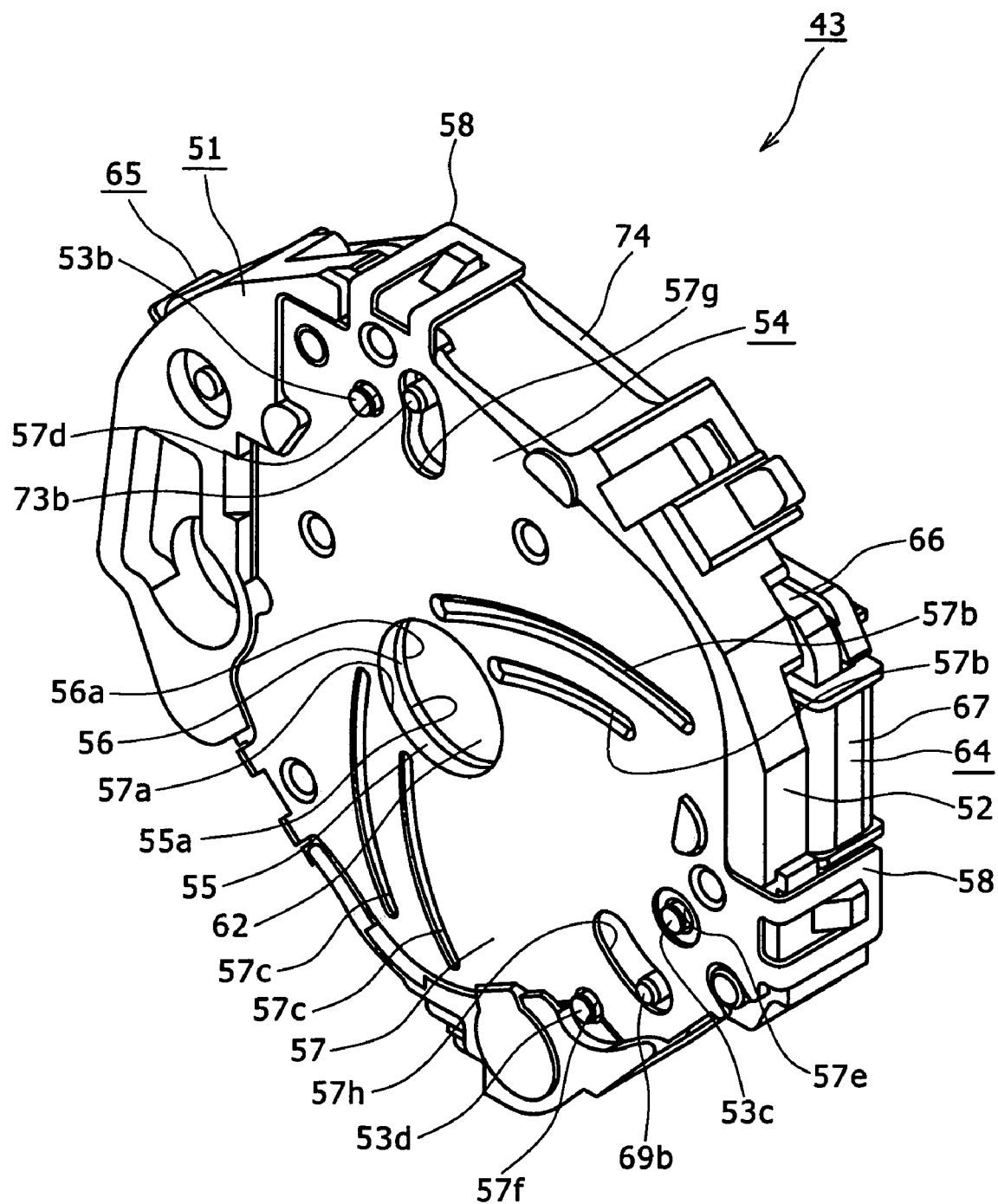
FIG. 10 is an enlarged perspective view of the light amount adjustment apparatus.

A cover plate 54, a first separator 55 and a second separator 56 are attached to the front face side of the base member 51 as seen in FIGS. 9 and 10.

The cover plate 54 is formed, for example, from a metal material and has a covering portion 57 directed in the forward and backward directions, and attached projections 58 projecting rearwardly from outer circumferential portions of the straightforward guide 37.

Figure 13:
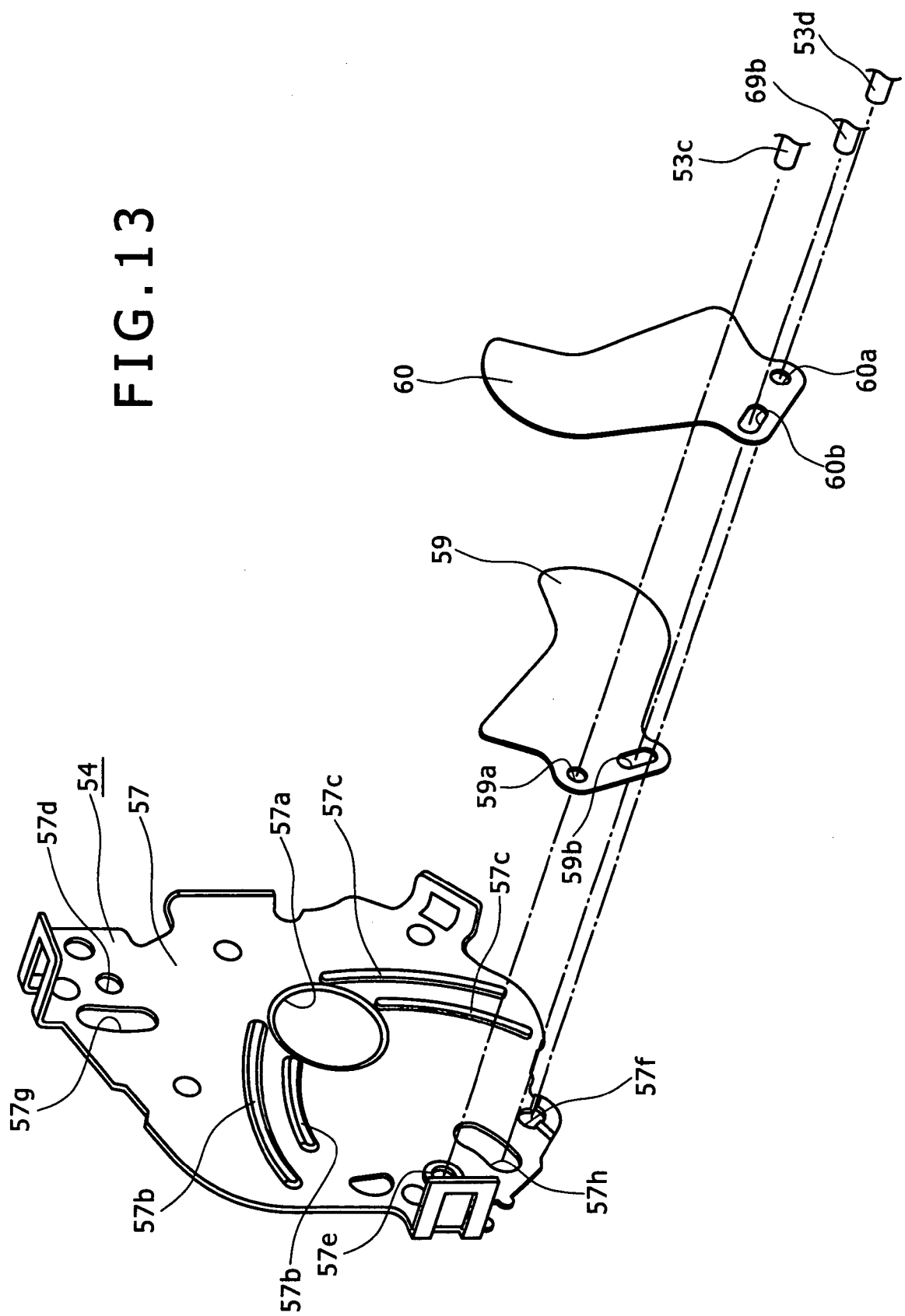
FIG. 13 is an enlarged exploded perspective view showing a cover plate and shutter blades of the light amount adjustment apparatus.

A light passing hole 57a smaller than the perforation 53a of the base member 51 is formed at a central portion of the covering portion 57. A pair of first sliding projections 57b and a pair of second sliding projections 57c are formed on the covering portion 57 so as to be swollen rearwardly by stamping as seen in FIGS. 9 and 13.

Three shaft insertion holes 57d, 57e and 57f and two arcuate fitting holes 57g and 57h are formed at outer circumferential portions of the covering portion 57. The shaft insertion hole 57d and the shaft insertion holes 57e and 57f are formed on the substantially opposite sides to each other across the light passing hole 57a, and the shaft insertion holes 57e and 57f are positioned in a spaced relationship from each other in the circumferential direction. Further, the fitting hole 57g is positioned in the proximity of the shaft insertion hole 57d, and the fitting hole 57h is positioned between the shaft insertion holes 57e and 57f.

Referring to FIG. 9, the first separator 55 has a transmission hole 55a formed at a central portion thereof with a size substantially equal to that of the light passing hole 57a of the cover plate 54. Three shaft insertion holes 55b, 55c and 55d and arcuate fitting holes 55e and 55f are formed at outer circumferential portions of the first separator 55. The shaft insertion hole 55b and the shaft insertion holes 55c and 55d are positioned on the substantially opposite sides to each other across the transmission hole 55a, and the shaft insertion holes 55c and 55d are positioned in a spaced relationship from each other in the circumferential direction. Further, the fitting hole 55e is positioned in the proximity of the shaft insertion hole 55b, and the fitting hole 55f is positioned between the shaft insertion holes 55c and 55d.

The second separator 56 has a transmission hole 56a formed at a central portion thereof with a size substantially equal to that of the light passing hole 57a of the cover plate 54. Two shaft insertion holes 56b and 56c and two arcuate fitting holes 56d and 56e are formed at outer circumferential portions of the second separator 56. The shaft insertion hole 56b and the shaft insertion hole 56c are positioned on the substantially opposite sides to each other across the transmission hole 56a, and the fitting holes 56d and 56e are positioned in the proximity of the shaft insertion holes 56b and 56c, respectively.

A pair of shutter blades 59 and 60 and a filter blade 61 are supported for pivotal motion on the base member 51 as seen in FIGS. 9 and 13. The shutter blades 59 and 60 and the filter blade 61 function as light amount adjustment members for adjusting the amount of light to be fetched into the image pickup apparatus 1 through the perforation 53a of the base member 51.

The shutter blades 59 and 60 are each formed from a material in the form of a sheet and have shaft insertion holes 59a and 60a and action holes 59b and 60b formed at one end portion thereof. The action holes 59b and 60b are elongated in one direction.

Figure 14:
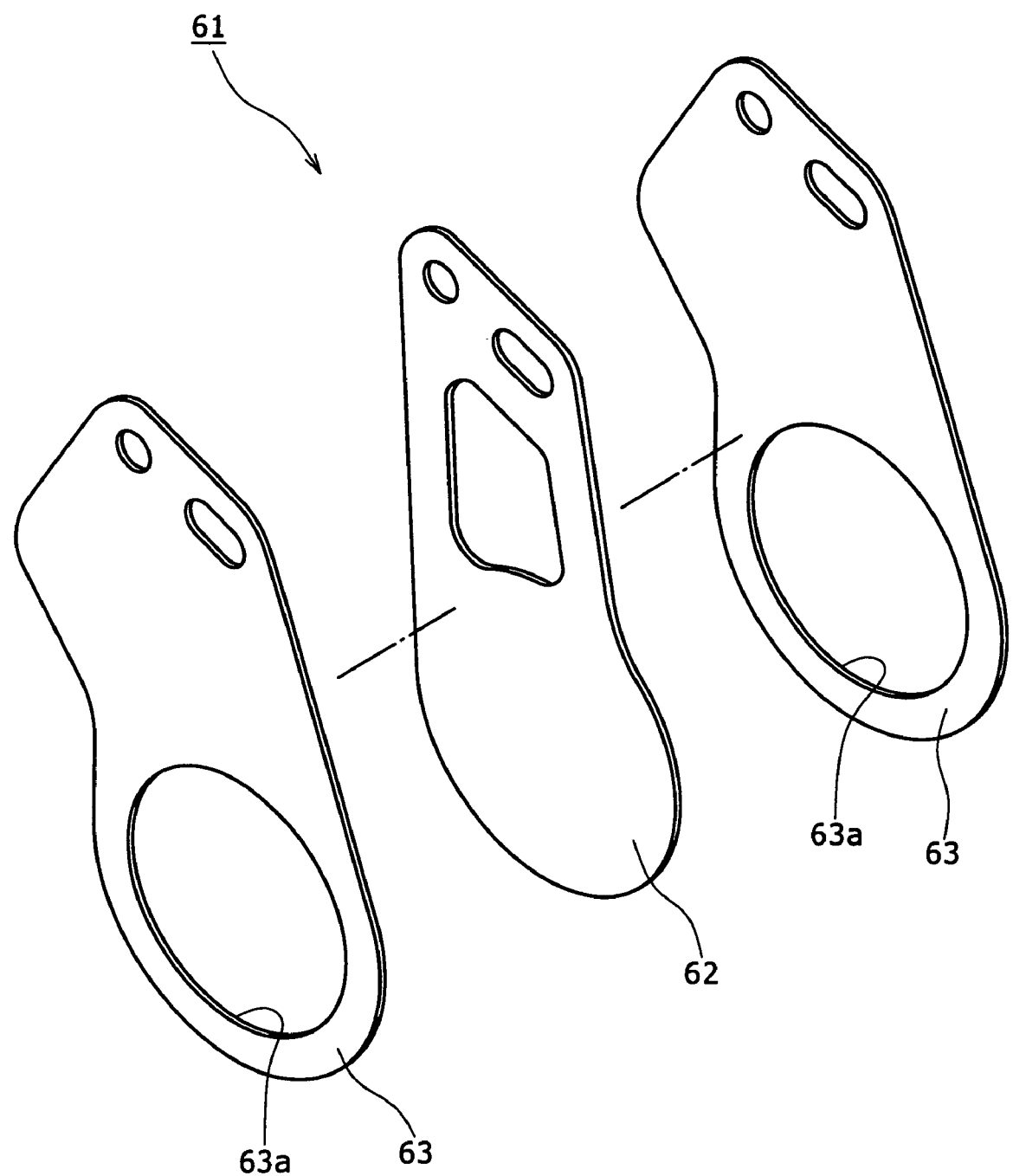
FIG. 14 is an enlarged exploded perspective view of a filter blade of the light amount adjustment apparatus.
Figure 15:
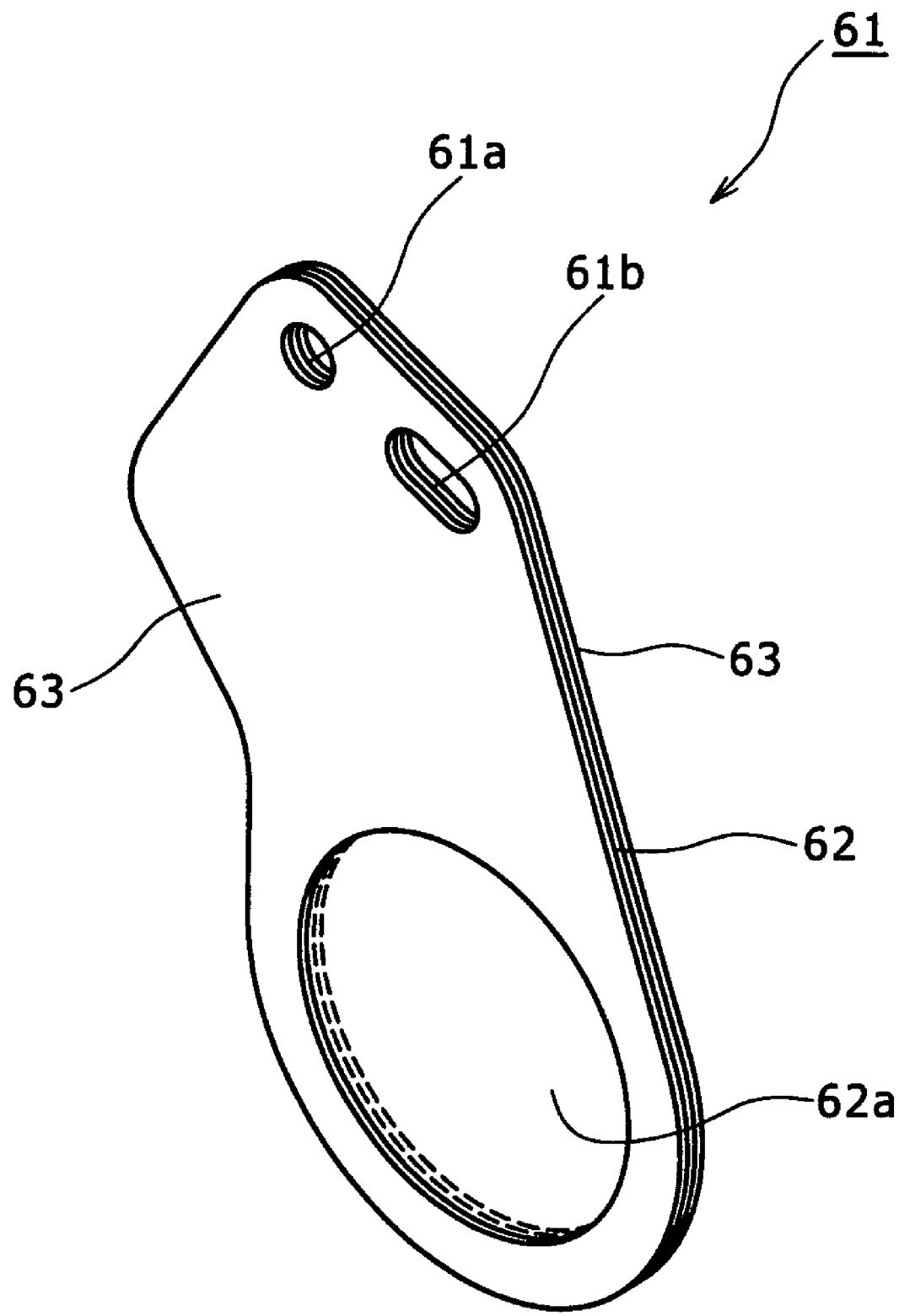
FIG. 15 is an enlarged perspective view of the filter blade.

Referring to FIGS. 14 and 15, the filter blade 61 is from two sheet members 63 formed on the opposite faces of a dimming filter 62 and coupled in a laminated state to each other. Each of the sheet members 63 has a circular hole 63a formed therein. The circular hole 63a has a diameter greater than that of the transmission hole 55a of the first separator 55. Accordingly, the filter blade 61 is exposed at the dimming filter 62 thereof at a position corresponding to the circular holes 63a. The exposed portion of the filter blade 61 is provided as a control portion 62a which controls and adjusts the amount of light. The dimming filter 62 is formed from an ND (Neutral Density) filter.

The filter blade 61 has formed at one end portion thereof a shaft insertion hole 61a and an action hole 61b which is elongated in one direction.

The second separator 56 is disposed at the mounting recessed portion 53 of the base member 51, and the filter pivotal motion center shaft 53b and the shutter pivotal motion center shaft 53c of the base member 51 are inserted in the shaft insertion holes 56b and 56c of the second separator 56, respectively. The shutter pivotal motion center shaft 53d is positioned on the immediately outer side of the second separator 56.

The filter blade 61 is supported on the front face side of the second separator 56 as seen in FIG. 9. The filter pivotal motion center shaft 53b of the base member 51 is inserted in the shaft insertion hole 61a of the filter blade 61 such that the filter blade 61 is supported for pivotal motion around the filter pivotal motion center shaft 53b on the base member 51.

The filter blade 61 has such a three-member configuration that the sheet members 63 are coupled in a layered fashion to the opposite faces of the dimming filter 62 as described hereinabove such that otherwise possible damage to the dimming filter 62 upon pivotal motion of the dimming filter 62 between the first separator 55 and the second separator 56 can be prevented.

In a state wherein the first separator 55 is attached to the base member 51, the shutter blades 59 and 60 are supported for pivotal motion on the base member 51 as seen in FIG. 13. In particular, the shutter pivotal motion center shafts 53c and 53d of the base member 51 are inserted in the shaft insertion holes 59a and 60a of the shutter blades 59 and 60, respectively. Consequently, the shutter blades 59 and 60 are supported in a partially overlapping relationship with each other for pivotal motion around the shutter pivotal motion center shafts 53c and 53d of the base member 51 on the base member 51, respectively.

In a state wherein the shutter blades 59 and 60 are supported on the base member 51, the cover plate 54 is attached to the base member 51 as seen in FIGS. 9 and 10. The cover plate 54 is attached to the base member 51 with the attached projections 58 thereof engaged with the outer circumferential portion 52 of the base member 51. Accordingly, the shutter blades 59 and 60 are disposed for pivotal motion between the cover plate 54 and the first separator 55.

Figure 12:
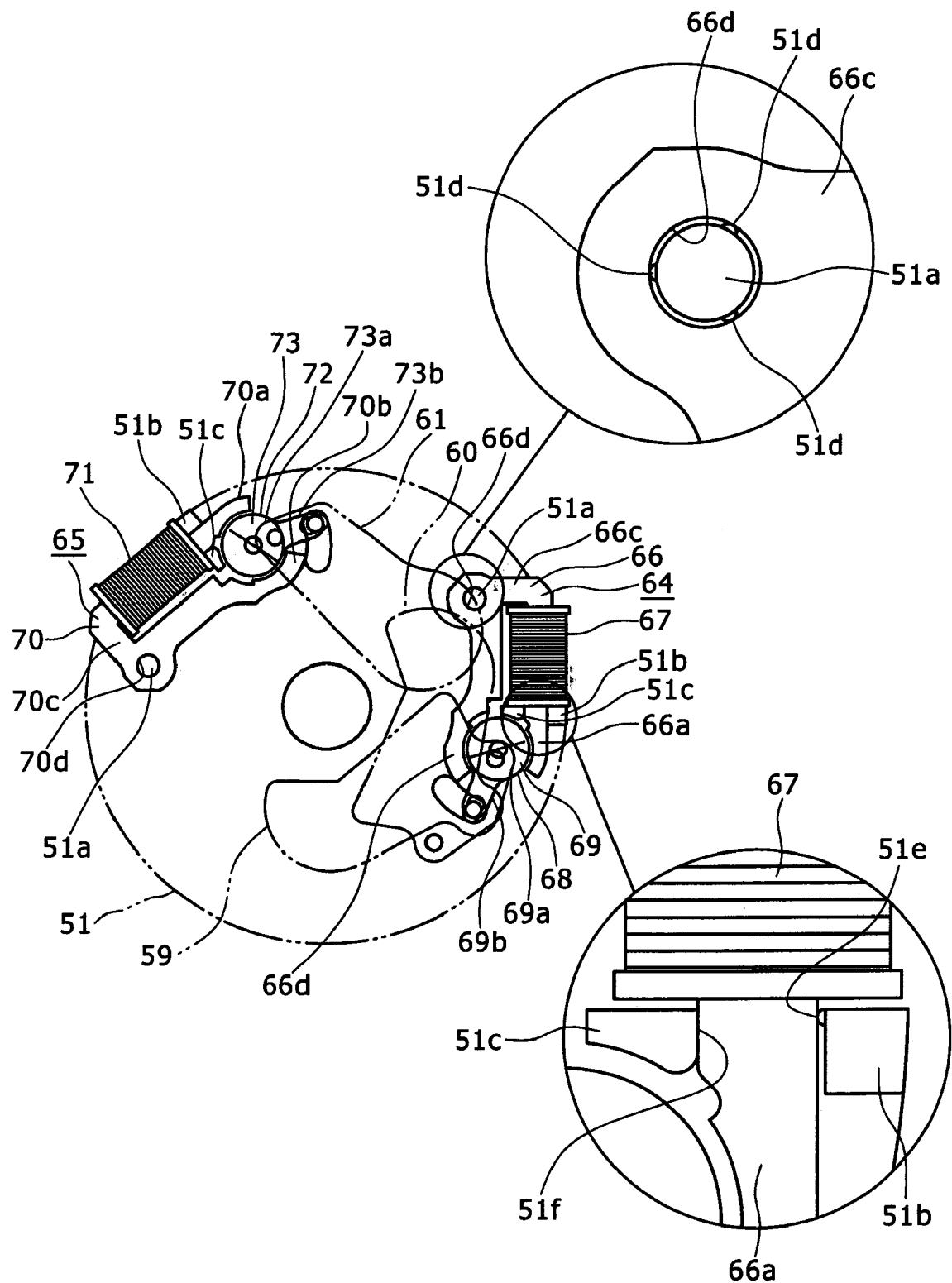
FIG. 12 is an enlarged front elevational view showing a first actuator and a second actuator of the light amount adjustment apparatus in a state attached to the base member.

A first actuator 64 and a second actuator 65 are attached to the rear face of the base member 51 as seen in FIGS. 9 and 12.

The first actuator 64 has a core 66, and a coil 67, a magnet 68 and a driving arm 69 held on the core 66. The driving arm 69 has a base portion 69a, and an arm portion 69b projecting forwardly from the base portion 69a. A driving pin 69c is provided at a free end portion of the arm portion 69b.

The core 66 has a pair of confronting portions 66a and 66b positioned so as to sandwich the magnet 68 therebetween from an outer circumference side, and a connecting portion 66c for connecting end portions of the confronting portions 66a and 66b to each other. The other end portions of the confronting portions 66a and 66b are formed arcuately along the outer circumferential face of the magnet 68.

The second actuator 65 has a core 70, and a coil 71, a magnet 72 and a driving arm 73 held on the core 70. The driving arm 73 has a base portion 73a, and an arm portion 73b projecting forwardly from the base portion 73a. A driving pin 73c is provided at a free end portion of the arm portion 73b.

The core 70 has a pair of confronting portions 70a and 70b positioned so as to sandwich the magnet 72 from an outer circumference side, and a connecting portion 70c for interconnecting end portions of the confronting portions 70a and 70b. End portions of the confronting portions 70a and 70b are shaped arcuately along the outer circumferential face of the magnet 68.

The connecting portions 66c and 70c of the cores 66 and 70 have circular attached holes 66d and 70d formed therein, respectively.

The first actuator 64 and the second actuator 65 exert rotating force between the cores 66 and 70 and the magnets 68 and 72 in response to current flowing through the coils 67 and 71, respectively. By the rotating force, the driving arms 69 and 73 are pivoted in a direction corresponding to the direction of the current flowing through the coils 67 and 71, respectively.

The first actuator 64 and the second actuator 65 are attached to positions of the base member 51 spaced away from each other in a circumferential direction while they are held from rearwardly by a holding plate 74 as seen in FIGS. 7 to 9.

The first actuator 64 and the second actuator 65 are attached to the base member 51 by means of the attaching projections 51a, 51b and 51c as seen in FIG. 12.

The first actuator 64 is attached to the base member 51 such that the attaching projection 51a is inserted in the attached hole 66d of the core 66 and a free end side portion of the confronting portion 66a of the core 66 is inserted and fitted between the attaching projections 51b and 51c.

In a state wherein the first actuator 64 is attached to the base member 51, the attaching projection 51a is force fitted in the attached hole 66d with the small protrusions 51d interposed therebetween and the free end side portion of the confronting portion 66a of the core 66 is force fitted between the attaching projections 51b and 51c with the small protrusion 51e interposed therebetween while the core 66 is pressed in a face-contacting relationship against the pushed face 51f of the attaching projection 51c. Accordingly, the first actuator 64 is secured to the base member 51.

Since the free end side portion of the confronting portion 66a of the core 66 is forced fitted between and sandwiched by the attaching projections 51b and 51c, the attaching projections 51b and 51c function as first and second sandwiching portions, respectively.

Also the second actuator 65 is attached to the base member 51 in a similar manner to the first actuator 64. In particular, the attaching projection 51a is inserted and fitted in the attached hole 66d of the core 66, and a free end side portion of the confronting portion 66a of the core 66 is inserted and fitted between the attaching projections 51b and 51c so to attach and secure the second actuator 65 to the base member 51.

As described above, in the image pickup apparatus 1, since the attaching projections 51a and 51b having the small protrusions 51d and 51e are provided at two locations of the base member 51 to secure the first actuator 64 and the second actuator 65, play of the first actuator 64 and the second actuator 65 with respect to the base member 51 can be prevented without the necessity to raise the working accuracy for various portions relating to attachment of the first actuator 64 and the second actuator 65 to the base member 51.

Further, since the circular attached holes 66d and 70d are formed in the cores 66 and 70, respectively, and the three small protrusions 51d are provided in a spaced relationship from each other in a circumferential direction on the outer circumferential face of the attaching projection 51a, stabilization of the attaching state of the first actuator 64 and the second actuator 65 to the base member 51 can be anticipated.

Further, since the small protrusion 51e is provided on the attaching projection 51b and the pushed face 51f is formed on the attaching projection 51c, the core 66 is attached to the base member 51 in a state wherein the free end side portion of the confronting portion 66a of the core 66 is held in face contact with the pushed face 51f. Consequently, a stabilized attachment state of the first actuator 64 and the second actuator 65 can be assured.

Furthermore, since the attaching projection 51b and the attaching projection 51c are positioned in the proximity of the magnets 68 and 72, the positional accuracy between the circumferential faces of the magnets 68 and 72 and the opposing faces of the cores 66 and 70 is improved. Consequently, high reliability in operation of the first actuator 64 and the second actuator 65 can be assured.

In addition, since the attaching projection 51a and the attaching projections 51b and 51c are positioned on the opposite sides to each other with respect to each of the coils 67 and 71, the distance between the attaching projection 51a and the attaching projections 51b and 51c is so great that stabilization of the attaching state of the first actuator 64 and the second actuator 65 to the base member 51 can be anticipated.

It is to be noted that, while the three small protrusions 51d are provided on the attaching projection 51a described above, the number of such small protrusions 51d provided on the attaching projection 51a is not limited to three but may be any number equal to or greater than two.

Further, while the small protrusion 51e is provided on the attaching projection 51b and the pushed face 51f is formed on the attaching projection 51c as described above, conversely the pushed face may be formed on the attaching projection 51b while the small projection is provided on the attaching projection 51c.

In the state wherein the first actuator 64 and the second actuator 65 are attached to the base member 51, the driving pin 69c of the driving arm 69 is fitted in order into the fitting hole 53f of the base member 51, the shaft insertion hole 56e of the second separator 56, the action holes 59b and 60b of the shutter blades 59 and 60, the fitting hole 55f of the first separator 55 and the fitting hole 57h of the cover plate 54. Meanwhile, the driving pin 73c of the driving arm 73 is fitted in order into the fitting hole 53e of the base member 51, the fitting hole 56d of the second separator 56, the action hole 61b of the filter blade 61, the fitting hole 55e of the first separator 55 and the fitting hole 57g of the cover plate 54.

As regards driving of the shutter blades 59 and 60, the shutter blades 59 and 60 are pivoted in the opposite directions to each other by pivotal motion of the driving arm 69 to open or close the perforation 53a.

As regards driving of the filter blade 61, the filter blade 61 is pivoted by pivotal motion of the driving arm 73 to open or close the perforation 53a.

A wiring line plate 75 is attached to the rear face of the holding plate 74 as seen in FIG. 4. The wiring line plate 75 is connected to the coils 67 and 71 and has a function of supplying power to the coils 67 and 71.

The light amount adjustment apparatus 43 configured in such a manner as described above is attached to the intermediate movable unit 42 with the base member 51 thereof engaged with the base frame 44, and the second movable unit 41 is formed from the intermediate movable unit 42 and the light amount adjustment apparatus 43.

The first movable unit 19 includes a movable frame 76 and a lens group 77 held on the movable frame 76 as seen in FIGS. 4 and 6. The lens group 77 is attached to a central portion of the movable frame 76 through a lens holder 78.

The first movable unit 19 is supported at the movable frame 76 thereof for sliding motion on the guide projections 39 of the straightforward guide 37 and supported for sliding motion on the cam cylinder 18. Accordingly, the first movable unit 19 is moved in the forward or backward direction, that is, in a direction of the optical axis, under the guidance of the straightforward guide 37 by rotation of the cam cylinder 18.

A lens barrier 79 is attached to the front face side of the first movable unit 19 as seen in FIGS. 4 and 6.

In a state wherein the lens barrier 79 is attached to the first movable unit 19, an ornamental ring 80 is attached to the outer face side of the movable frame 76 and the lens barrier 79.

While a preferred embodiment of the present invention has been described using specific terms, such description is for illustrative purpose only, and it is to be understood that changes and variations may be made without departing from the spirit or scope of the following claims.

What is claimed is:

1. A light amount adjustment apparatus, comprising:
a light amount adjustment member configured to be operated in a predetermined direction to adjust the amount of light transmitted through a lens group;
a rotatable magnet formed in a disk shape;
a driving arm configured to be pivoted by rotation of said magnet to operate said light amount adjustment member;
a core having a pair of confronting portions positioned so as to sandwich said magnet from an outer circumference side and a connecting portion configured to connect end portions of said confronting portions to each other;
a coil through which one of said confronting portions of said core extends; and
a base member having said core attached to said base member and supporting said magnet for rotation on said base member,
said base member having a plurality of attaching projections provided at least at two places of said base member for attaching said core to said base member, and
said attaching projections having a small projection for fitting with said core, and
said attaching projections include first and second sandwiching portions configured to sandwich said core between said first and second sandwiching portions.

2. The light amount adjustment apparatus according to claim 1, wherein at least one of said attaching projections are provided in the proximity of said magnet.

3. The light amount adjustment apparatus according to claim 1, wherein at least some of said attaching projections are provided at least at two positions on the opposite sides with respect to said coil in an axial direction.

4. A light amount adjustment apparatus, comprising:
a light amount adjustment member configured to be operated in a predetermined direction to adjust the amount of light transmitted through a lens group;
a rotatable magnet formed in a disk shape;
a driving arm configured to be pivoted by rotation of said magnet to operate said light amount adjustment member;
a core having a pair of confronting portions positioned so as to sandwich said magnet from an outer circumference side and a connecting portion configured to connect end portions of said confronting portions to each other;
a coil through which one of said confronting portions of said core extends; and
a base member having said core attached to said base member and supporting said magnet for rotation on said base member,
said base member having a plurality of attaching projections provided at least at two places of said base member for attaching said core to said base member, and
said attaching projections having a small projection for fitting with said core,
wherein said core has a circular attached hole formed in said core, and
one of said attaching projections which is inserted in said attached hole is formed in a substantially cylindrical shape and has at least two small protrusions in a spaced relationship from each other in a circumferential direction on an outer circumferential face of said attaching projection.

5. A light amount adjustment apparatus, comprising:
a light amount adjustment member configured to be operated in a predetermined direction to adjust the amount of light transmitted through a lens group;
a rotatable magnet formed in a disk shape;
a driving arm configured to be pivoted by rotation of said magnet to operate said light, amount adjustment member;
a core having a pair of confronting portions positioned so as to sandwich said magnet from an outer circumference side and a connecting portion configured to connect end portions of said confronting portions to each other;
a coil through which one of said confronting portions of said core extends; and
a base member having said core attached to said base member and supporting said magnet for rotation on said base member,
said base member having a plurality of attaching projections provided at least at two places of said base member for attaching said core to said base member, and
said attaching projections having a small projection for fitting with said core,
wherein said attaching projections include first and second sandwiching portions configured to sandwich said core between said first and second sandwiching portions, said first sandwiching portion having a small protrusion provided on said first sandwiching portion, and said second sandwiching portion having a pressed portion formed on said second sandwiching portion such that said core is pressed in a face contacting relationship against said pressed portion.

6. An image pickup apparatus, comprising:

a lens barrel having a predetermined lens group disposed inside;

an apparatus body configured to support said lens barrel; and a light amount adjustment apparatus incorporated in said lens barrel and configured to adjust the amount of light fetched through said lens group;

said light amount adjustment apparatus including a light amount adjustment member configured to be operated in a predetermined direction to adjust the amount of light transmitted through a lens group, a rotatable magnet formed in a disk shape, a driving arm configured to be pivoted by rotation of said magnet to operate said light amount adjustment member, a core having a pair of confronting portions positioned so as to sandwich said magnet from an outer circumference side and a connecting portion configured to connect end portions of said confronting portions to each other, a coil through which one of said confronting portions of said core extends, and a base member having said core attached to said base member and supporting said magnet for rotation on said base member, said base member having a plurality of attaching projections provided at least at two places of said base member for attaching said core to said attaching projections, and said attaching projections having a small projection for fitting with said core, and said attaching projections include first and second sandwiching portions configured to sandwich said core between said first and second sandwiching portions.

\* \* \* \* \*